US008610069B2

(12) United States Patent
Swank et al.

(10) Patent No.: US 8,610,069 B2
(45) Date of Patent: Dec. 17, 2013

(54) COAXIAL TO DUAL CO-PLANAR WAVEGUIDE LAUNCHER FOR MICROWAVE BOLOMETRY

(75) Inventors: John D. Swank, Hudson, OH (US); Jefferson D. Lexa, Chesterland, OH (US); Andrew S. Brush, Chardon, OH (US)

(73) Assignee: Tegam, Inc., Geneva, OH (US)

( * ) Notice: Subject to any disclaimer, the term of this patent is extended or adjusted under 35 U.S.C. 154(b) by 349 days.

(21) Appl. No.: 12/983,526

(22) Filed: Jan. 3, 2011

(65) Prior Publication Data

US 2011/0168893 A1 Jul. 14, 2011

Related U.S. Application Data

(60) Provisional application No. 61/294,503, filed on Jan. 13, 2010.

(51) Int. Cl.
  *G01J 5/34* (2006.01)
  *G01K 7/08* (2006.01)
  *G01K 7/22* (2006.01)

(52) U.S. Cl.
  USPC .................. 250/338.3; 374/180; 374/185

(58) Field of Classification Search
  USPC .................. 250/338.3; 374/185, 180
  See application file for complete search history.

(56) References Cited

U.S. PATENT DOCUMENTS

| 4,288,775 | A | * | 9/1981 | Bennewitz et al. ............. 338/35 |
| 5,064,997 | A | | 11/1991 | Fang et al. |
| 5,537,288 | A | | 7/1996 | Felps |
| 6,361,207 | B1 | | 3/2002 | Ferguson |
| 6,767,128 | B1 | | 7/2004 | Daulle |
| 6,788,722 | B1 | * | 9/2004 | Kennedy et al. ................. 372/64 |
| 7,315,223 | B2 | * | 1/2008 | Margomenos ................... 333/34 |

OTHER PUBLICATIONS

PCT International Preliminary Report on Patentability issued Jul. 10, 2013.

* cited by examiner

*Primary Examiner* — David Porta
*Assistant Examiner* — Kenneth J Malkowski
(74) *Attorney, Agent, or Firm* — Buckingham, Doolittle & Burroughs, LLC (57) ABSTRACT

A dual-coplanar sensor architecture is constructed by launching from coaxial airline to a unique arrangement of coplanar waveguides, arranged symmetrically on both sides of a thin dielectric substrate. The center conductor of the coaxial airline makes electrical contact with the middle conductor of both the top and bottom coplanar waveguides. The characteristic impedance of the top and bottom coplanar waveguides is designed to be approximately twice the characteristic impedance of the coaxial airline, such that the parallel combination of the two coplanar waveguides is the characteristic impedance of the coaxial airline. Further, steps in both the ground planes and center conductor at the point of transition from coaxial to coplanar are used to tune the launch and minimize reflection at the launch.

17 Claims, 5 Drawing Sheets

FIG. 6

COAXIAL TO DUAL CO-PLANAR WAVEGUIDE LAUNCHER FOR MICROWAVE BOLOMETRY

CROSS-REFERENCE

This application claims priority from Provisional Patent Application Ser. No. 61/294,503 filed Jan. 13, 2010.

BACKGROUND

Previous coaxial thermistor bolometers, of which examples include Hewlett-Packard model 478 and Weinschel (or TEGAM) M1110, used "bead" thermistors, which were hung from fine wires in gaps in complex three-dimensional structures that formed the center conductor of a coaxial airline. Other published bolometers placed the resistive element radially between the center conductor and outer conductor of a coaxial airline. When the termination was a thermistor, it was again hung from a fine wire. In one published concept, a nickel barreter was constructed radially using a thin film of nickel on a substrate.

In all of these concepts, the arrangement of the temperature-sensitive element required a sharp step in the conductor. Bead thermistors hanging on fine wire result in a step in width of the center conductor from, typically, many tens of thousandths of an inch, to under one thousandth of an inch. The resulting inductive discontinuity resulted in unsatisfactory reflection at higher frequencies.

Further, the use of fine wire resulted in a structure that is difficult to assemble and easy to damage. Use of metal barreters in the case of thin-film terminations are easily damaged with excess power.

Accordingly, there is a long felt need in the art for a coaxial thermistor bolometer that eliminates the reflection due to the sharp discontinuity between the waveguide and fine wire of the thermistor, while improving robustness and manufacturability by addressing the mechanical fragility of the wire. Specifically, a bolometer structure is needed wherein the structure of the waveguide leading to the thermistor can be well matched with a new thermistor design that does not depend on fine wires for thermal isolation.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

A dual-coplanar sensor architecture is constructed by launching radio frequency energy from a coaxial airline to a unique arrangement of coplanar waveguides, arranged symmetrically on both sides of a thin dielectric substrate. The center conductor of the coaxial airline makes electrical contact with the middle conductor of both the top and bottom coplanar waveguides. The characteristic impedance of the top and bottom coplanar waveguides is such that the parallel combination of the two coplanar waveguides is the characteristic impedance of the coaxial airline.

Further, steps in both the ground planes and center conductor at the point of transition from coaxial to coplanar are used to tune the launch and minimize reflection at the launch. The coplanar waveguides are tapered, while maintaining the required impedance to a width such that the center conductor is approximately the same width as a temperature-dependent resistive termination element used to terminate the coplanar waveguide. Additionally, ground planes are stepped or tapered in the neighborhood of the termination to minimize reflection.

Furthermore, capacitors are arranged between the end of the termination resistors that are not connected to the input, and the ground planes, to complete a path for high-frequency current. A DC current path exists from the end of one termination resistor that is connected to capacitors, through the resistor, through the center conductor of the coplanar waveguide on that side of the substrate, to the launch, where the two coplanar and one coaxial center conductors are connected electrically, back through the other resistor.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Conventional coaxial thermistor bolometers use "bead" thermistors, which are hung from fine wires in gaps in complex three-dimensional structures that formed the center conductor of a coaxial airline. Other published bolometers placed the resistive element radially between the center conductor and outer conductor of coaxial airline, or a nickel barreter was constructed radially using a thin film of nickel on a substrate.

However, these structures are complex and introduce excessive inductance through dimensional discontinuity. Further, the complexity introduces low manufacturing yields. The arrangement requires by-pass capacitors being placed in the air gap of coaxial airline, where they are limited in size. Therefore, the limit on capacitors limits the lower frequency of the sensor. Use of large capacitors to achieve lower frequencies introduces inductance, and limits higher frequencies.

Furthermore, the arrangement of the temperature-sensitive element required a sharp step in the conductor. Bead thermistors hanging on fine wire result in a step in width of the center conductor from, typically, many tens of thousandths of an inch, to under one thousandth of an inch. The resulting inductive discontinuity resulted in unsatisfactory reflection at higher frequencies.

Thus, the launch to symmetrically arranged coplanar waveguide is unique in power sensors, and there is no known application of such a launch from coaxial airline. Accordingly, the construction of a bolometer based on two symmetrically-arranged resistors with a strong temperature coefficient (thermistors) in any planar waveguide has not previously been done.

Specifically, this invention uses thermistors that have been specially developed to be planar, and approximately the same width as the center conductor of the coplanar waveguides. As a result, the reflection due to the sharp discontinuity between the waveguide and fine wire of the thermistor is eliminated. Low reflections at higher frequencies than before demonstrated are now possible.

The physical arrangement of the planes facilitate use of a range of bypass capacitors: Small, low-value capacitors in a small current loop, in parallel with physically larger, higher-value capacitors for bypassing lower-frequency current in a path with higher inductance. This arrangement allows high-frequency sensors of at least 50 GHz upper frequency to operate at lower frequencies below those previously available in low-reflection bolometer sensors.

The construction of the coaxial airline portion of the launcher is technologically similar to a standard launcher, with the exception of minor geometric differences to facilitate symmetrical connection to the edge of the coplanar substrate. The coplanar waveguide is constructed using standard thin-film or thick-film processes. The planar thermistor is constructed using standard thick film processes. Assembly is relatively straightforward in comparison to previous thermistor bolometer designs. All of these features make the new sensor capable of being assembled quickly and repeatably, with some steps such as capacitor placement capable of being automated.

The disclosed architecture provides a microwave bolometer power sensor constructed by launching from coaxial airline to a unique arrangement of coplanar waveguides, arranged symmetrically on both sides of a thin dielectric substrate. The center conductor of the coaxial airline makes electrical contact with the middle conductor of both the top and bottom coplanar waveguides. The characteristic impedance of the top and bottom coplanar waveguides is designed such that the parallel combination of the two coplanar waveguides is the characteristic impedance of the coaxial airline. Steps in both the ground planes and center conductor at the point of transition from coaxial to coplanar are used to tune the launch and minimize reflection at the launch.

The coplanar waveguides are tapered, while maintaining the required impedance to a width such that the center conductor is approximately the same width as a temperature-dependent resistive termination element used to terminate the coplanar waveguide. The similarity in width results in relatively minimal reflection at the interface between the waveguide structure and resistive element. Ground planes are stepped or tapered in the neighborhood of the termination to minimize reflection.

Capacitors are arranged between the end of the termination resistors that is not connected to the input, and the ground planes, to complete a path for high-frequency current.

A DC current path exists from the end of one termination resistor that is connected to capacitors, through the resistor, through the center conductor of the coplanar waveguide on that side of the substrate, to the launch, where the two coplanar and one coaxial center conductors are connected electrically, back through the other resistor. This path has no DC connection to ground inside the sensor. This path may be used to apply DC energy to the termination resistor independent of the Radio Frequency (RF) energy supplied through the coaxial airline.

The dielectric substrate in the prototype embodiment is constructed of amorphous Quartz between about 0.005" and 0.0030" in thickness, but in a preferred embodiment approximately 0.010" in thickness. The substrate thickness should be as thin as possible while retaining mechanical strength, and no thicker than the diameter of the center conductor of the associated co-axial air line. The thickness used was selected from commercially-available stock, and is not representative of a particularly required thickness. Amorphous Quartz was selected as having a low dielectric constant and high thermal resistance. Microwave substrates are normally selected to have low thermal resistance to aid in cooling components, however it is important in microwave bolometers to concentrate temperature rise in the region of the termination resistance. Other suitable materials may exist and be used without affecting the overall concept of the invention, including at lower frequencies glass-filled Teflon such as "Rogers Material" or even glass-fiber reinforced composites of polyester or epoxy resins.

Thus, the dual-coplanar sensor assembly provides the lowest-uncertainty method for measuring microwave power to at least 50 GHz. This application includes use as a national primary standard and as a transfer standard in calibration laboratories. Further, the frequency range is clearly extensible to at least 70 GHz through alterations in the coaxial input line, and possibly higher. And, the concept of matching line geometry to a specially-made thermistor also has potential for construction of waveguide-based thermistor bolometer sensors for very high-frequency microwave power, up to at least 100 GHz, possibly higher.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
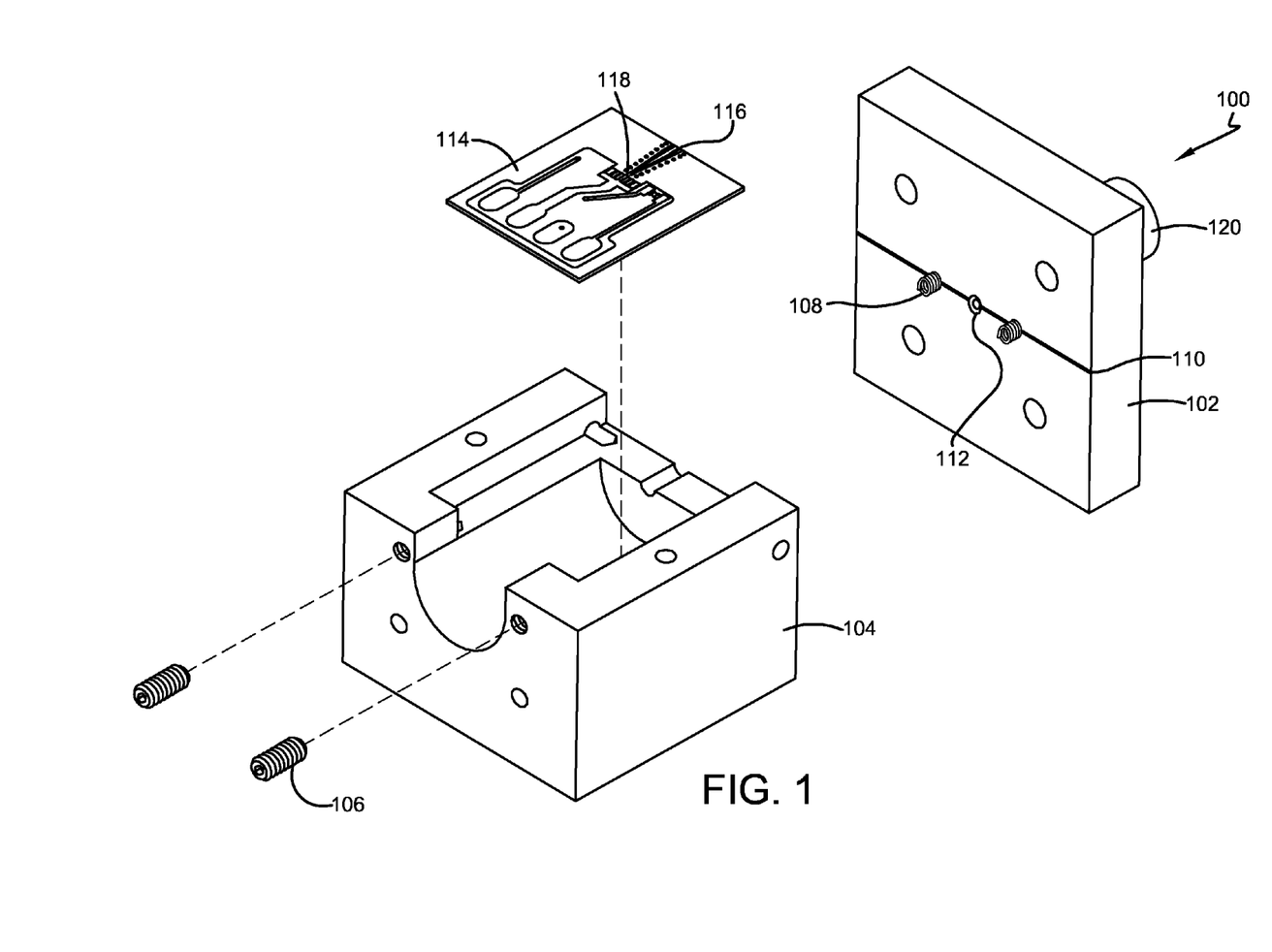
FIG. 1 illustrates an exploded perspective view of a preferred embodiment of a dual-coplanar sensor assembly in accordance with the disclosed architecture.

FIG. 1 illustrates a dual-coplanar sensor assembly 100 in accordance with the disclosed architecture. The front connector block 102 and bottom housing 104 configuration improves the ability to maintain physical pressure, and therefore electrical contact, on both the center conductor and ground return. Screws 106 provide force against the center conductor, while bellows springs 108 provide compliance in ground connection. Specifically, bellows springs 108 are utilized for DC and low frequency ground connection. The slot 110 improves AC coupling of ground return and reference number 112 shows the end of the co-axial airline. Further, co-axial connector 120 is where radio frequency (RF) power enters the assembly 100 to travel down the co-axial airline, and be launched into the coplanar waveguides 116, and eventually be dissipated in the thermistor 118. The dielectric substrate 114 is shown with metal ground planes and coplanar waveguide. The coplanar waveguides 116 are tapered, while maintaining the required impedance to a width such that the center conductor is the same width as a temperature-dependent resistive termination element used to terminate the coplanar waveguide 116. The match in width results in minimal reflection at the interface between the waveguide structure and resistive element.

The coplanar waveguides 116 are arranged symmetrically on both sides of the thin dielectric substrate 114. The center conductor of the coaxial airline makes electrical contact with the middle conductor of both the top and bottom coplanar waveguides 116. The characteristic impedance of the top and bottom coplanar waveguides 116 is designed to be approximately twice the characteristic impedance of the coaxial airline, such that the parallel combination of the two coplanar waveguides 116 is the characteristic impedance of the coaxial airline. Steps in both the ground planes and center conductor at the point of transition from coaxial to coplanar are used to tune the launch and minimize reflection at the launch.

Furthermore, the dielectric substrate 114 includes a gap (not shown) in metal between the ground and inside terminal, and a thermistor 118 located in the coplanar waveguide 116. The planar metal conductor of the thermistor 118 is sized to be the same width as the center conductor of the coplanar waveguides 116. As a result, the reflection due to the sharp discontinuity between the waveguide and fine wire of the thermistor is eliminated. Low reflections at higher frequencies than before demonstrated are now possible.

Figure 2:
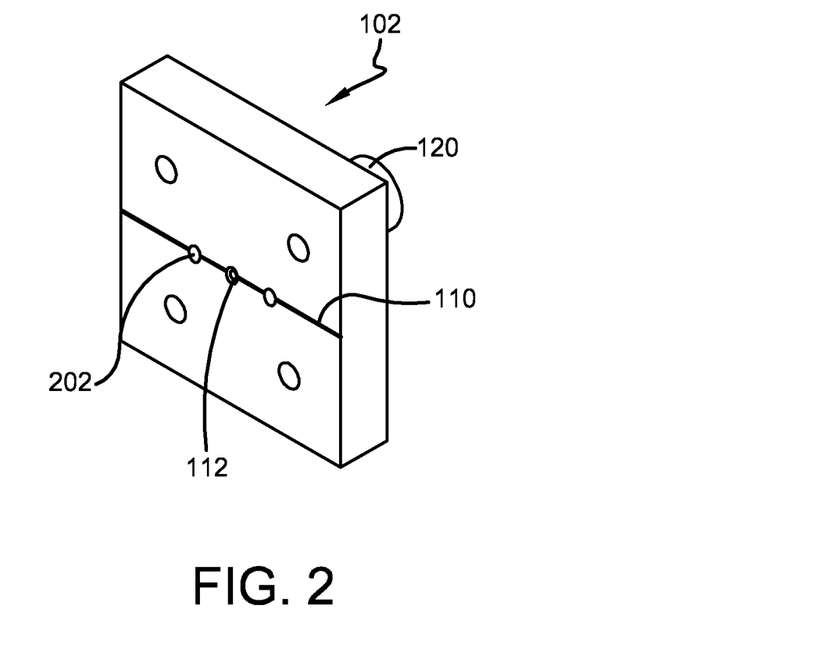
FIG. 2 illustrates a perspective view of the front connector block of the dual-coplanar sensor assembly in accordance with the disclosed architecture.

FIG. 2 illustrates the front connector block 102 of the dual-coplanar sensor assembly in accordance with the disclosed architecture. As stated supra, the front connector block 102 in combination with the bottom housing (not shown) improves the ability to maintain physical pressure, and therefore electrical contact, on both the center conductor and ground return. Bellows springs (not shown) are inserted in holes 202 to provide compliance in ground connection. Specifically, bellows springs are utilized for DC and low frequency ground connection. The slot 110 improves AC coupling of ground return and reference number 112 shows the end of co-axial airline. Further, co-axial connector 120 is where radio frequency (RF) power enters the assembly to travel down the co-axial airline, and be launched into the coplanar waveguides (not shown), and eventually be dissipated in the thermistor.

Figure 3:
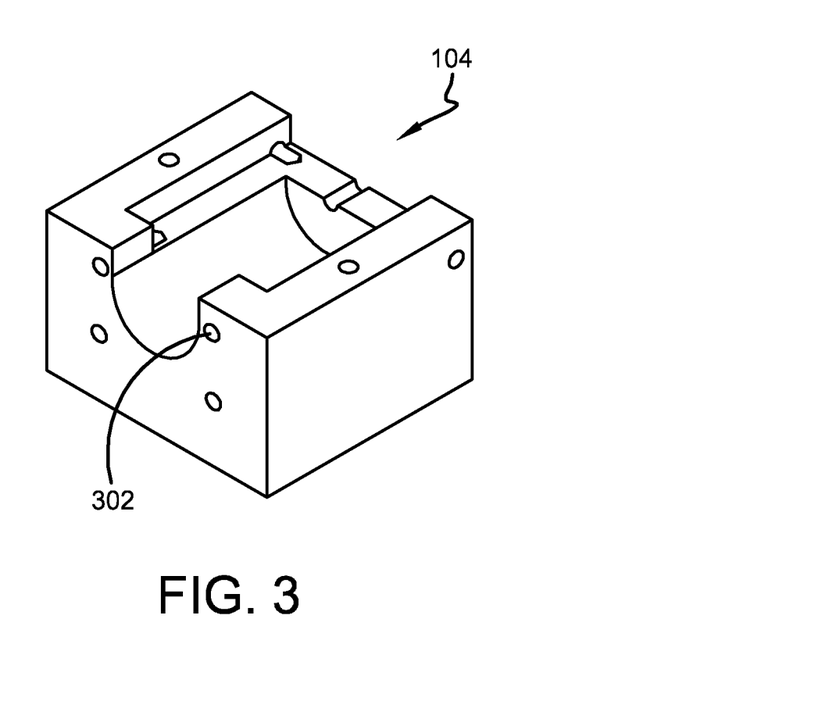
FIG. 3 illustrates a perspective view of the bottom housing of the dual-coplanar sensor assembly in accordance with the disclosed architecture.

FIG. 3 illustrates the bottom housing 104 of the dual-coplanar sensor assembly in accordance with the disclosed architecture. The bottom housing 104 in combination with the front connector block (not shown) improves electrical contact on both the center conductor and ground return. Screws (not shown) are inserted in holes 302 to provide force against center conductor. The screws in the bottom housing 104 aid in providing the ability to maintain physical pressure and therefore electrical contact.

Figure 4:
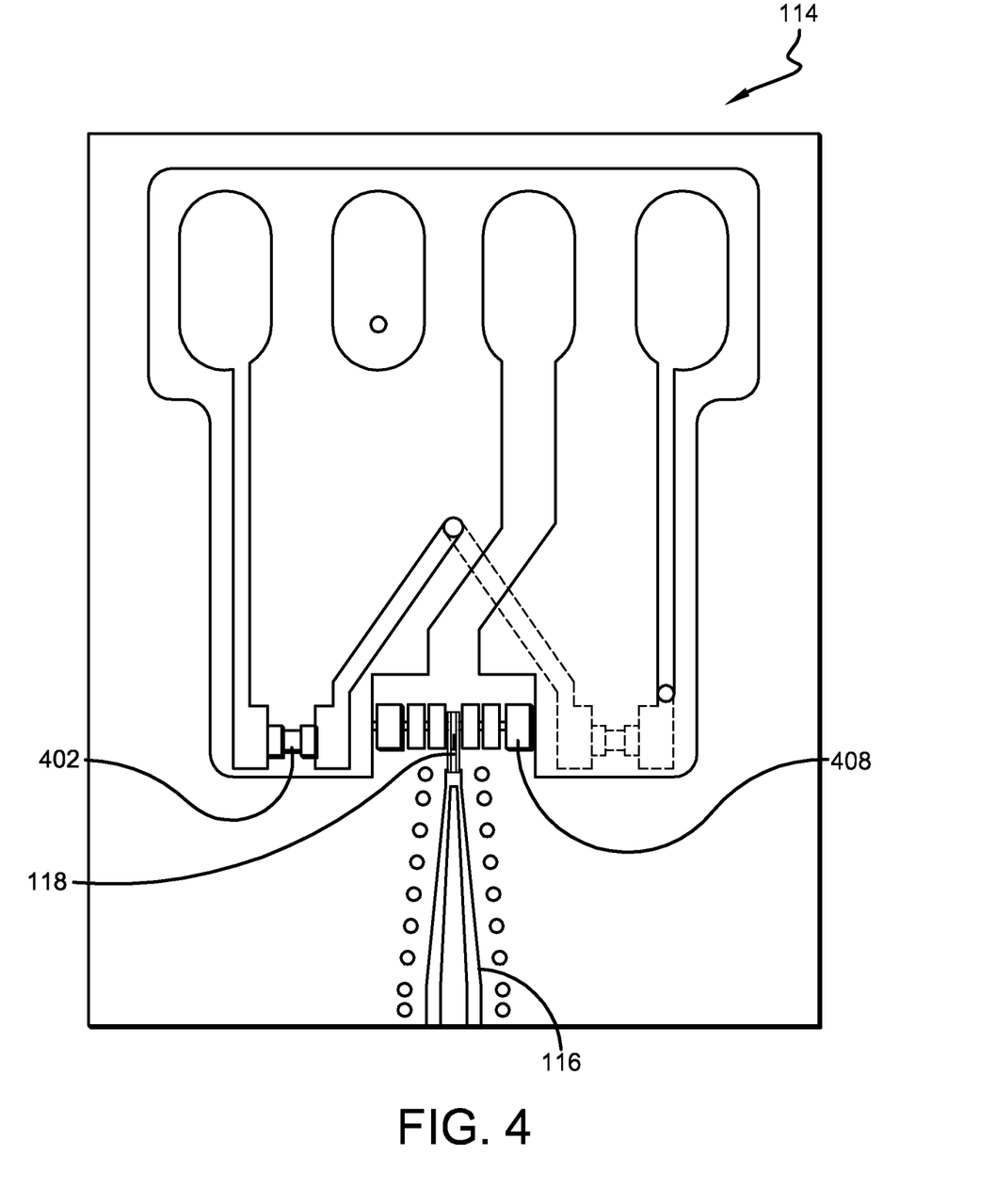
FIG. 4 illustrates a top view of the dielectric substrate of the dual-coplanar sensor assembly in accordance with the disclosed architecture.

FIG. 4 illustrates the dielectric substrate 114 of the dual-coplanar sensor assembly in accordance with the disclosed architecture. The dielectric substrate 114 comprises a commercial thermistor 402 used to measure and control ambient temperature, and a thick-film thermistor 118 mounted upside-down and typically composed of clear Quartz to see the metal and thermistor material on the bottom. Additionally, capacitors 408 and coplanar waveguides 116 are included in the dielectric substrate 114. The dielectric substrate 114 is typically constructed of amorphous Quartz between about 0.005" and 0.0030" in thickness, but in a preferred embodiment approximately 0.010" in thickness or at least no thicker than the diameter of the center conductor of the co-axial air-line. Amorphous Quartz was selected as having a low dielectric constant and high thermal resistance. Other suitable materials may exist, including at lower frequencies glass-filled Teflon such as "Rogers Material" or even glass-fiber reinforced composites of polyester or epoxy resins.

Further, the coplanar waveguides 116 are tapered, while maintaining the required impedance to a width such that the center conductor is the same width as a temperature-dependent resistive termination element used to terminate the coplanar waveguide 116. The match in width results in minimal reflection at the interface between the waveguide structure 116 and resistive element.

The coplanar waveguide 116 is constructed using standard thin-film or thick-film processes. The planar thermistor 118 is constructed using standard thick film processes. The coplanar waveguides 116 are arranged symmetrically on both sides of the thin dielectric substrate 114. And, the planar metal conductor of the thermistor 118 is sized to be the same width as the center conductor of the coplanar waveguides 116. As a result, the reflection due to the sharp discontinuity between the waveguide and fine wire of the thermistor is eliminated.

Figure 5:
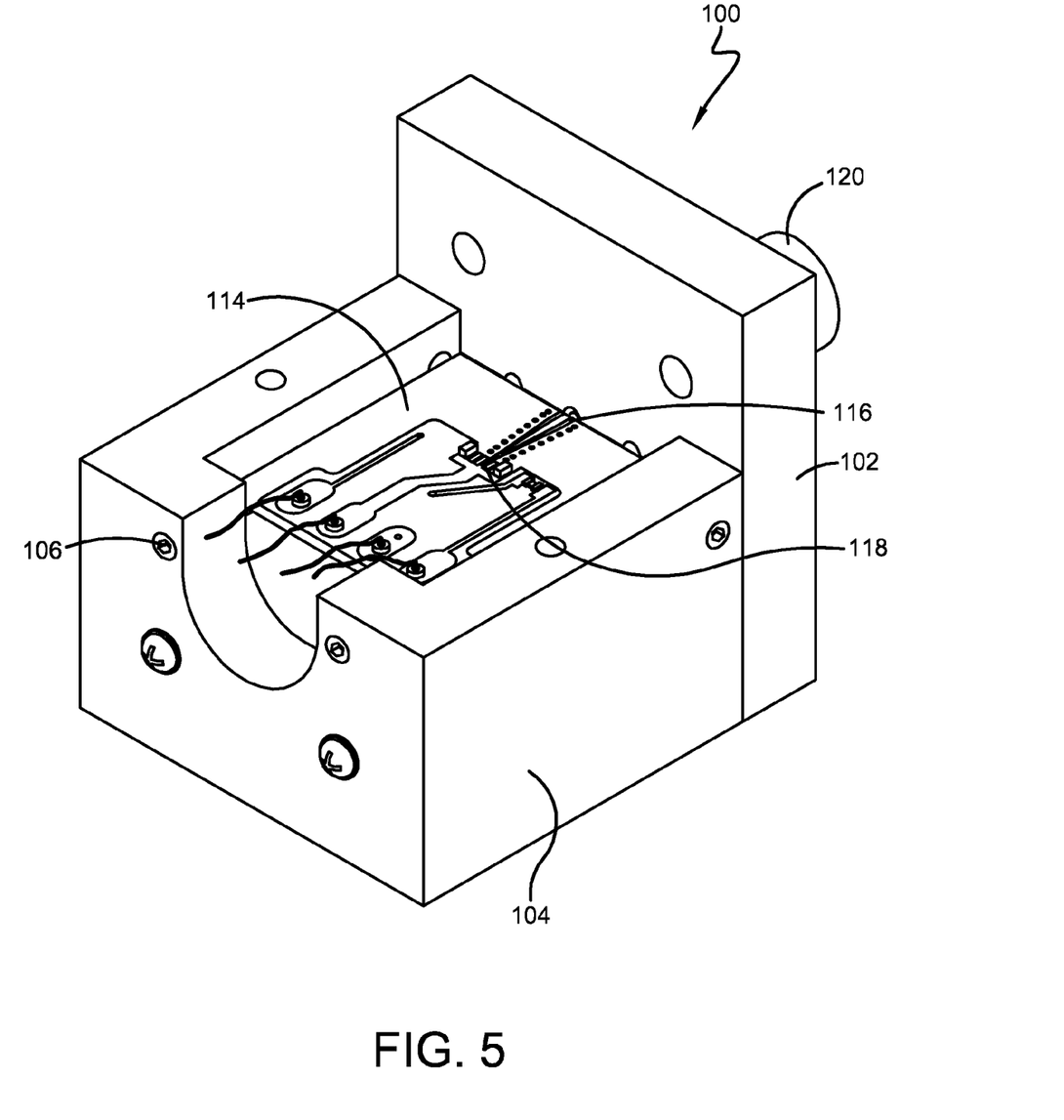
FIG. 5 illustrates a perspective view of the dual-coplanar sensor assembly in accordance with the disclosed architecture.

FIG. 5 illustrates the dual-coplanar sensor assembly 100 in accordance with the disclosed architecture. The front connector block 102 and bottom housing 104 configuration improves the ability to maintain physical pressure, and therefore electrical contact, on both the center conductor and ground return. Screws 106 provide force against the center conductor, while bellows springs (not shown) provide compliance in ground connection. Substrate 114 rests in the bottom housing 104 and is pressed into a slot in the front connector block 102. The substrate 114 is typically a dielectric substrate and is shown with metal ground planes and coplanar waveguide. The coplanar waveguides 116 are tapered, while maintaining the required impedance to a width such that the center conductor is the same width as a temperature-dependent resistive termination element used to terminate the coplanar waveguide 116. The match in width results in minimal reflection at the interface between the waveguide structure and resistive element.

The coplanar waveguides 116 are arranged symmetrically on both sides of the thin dielectric substrate 114. The center conductor of the coaxial airline makes electrical contact with the middle conductor of both the top and bottom coplanar waveguides 116. The characteristic impedance of the top and bottom coplanar waveguides 116 is designed to be approximately twice the characteristic impedance of the coaxial airline, such that the parallel combination of the two coplanar waveguides 116 is the characteristic impedance of the coaxial airline. Steps in both the ground planes and center conductor at the point of transition from coaxial to coplanar are used to tune the launch and minimize reflection at the launch.

Furthermore, the dielectric substrate 114 includes a gap (not shown) in metal between the ground and inside terminal, and a thermistor 118 located in the coplanar waveguide 116. The planar metal conductor of the thermistor 118 is sized to be the same width as the center conductor of the coplanar waveguides 116. As a result, the reflection due to the sharp discontinuity between the waveguide and fine wire of the thermistor is eliminated. Further, co-axial connector 120 is where radio frequency (RF) power enters the assembly 100 to travel down the co-axial airline, and be launched into the coplanar waveguides 116, and eventually be dissipated in the thermistor 118.

Additionally, in a preferred embodiment the metalized edge of the planar waveguide abuts against the end of a cylindrical inner conductor. However, other embodiments could use a slotted coaxial center conductor, or a center conductor fitted with a conductive spring. This embodiment uses a slot and bellows springs in the outer conductor to improve ground coupling, however other successful embodiments may use springs, solder, conductive glue, or other means to create a good ground connection.

Figure 6:
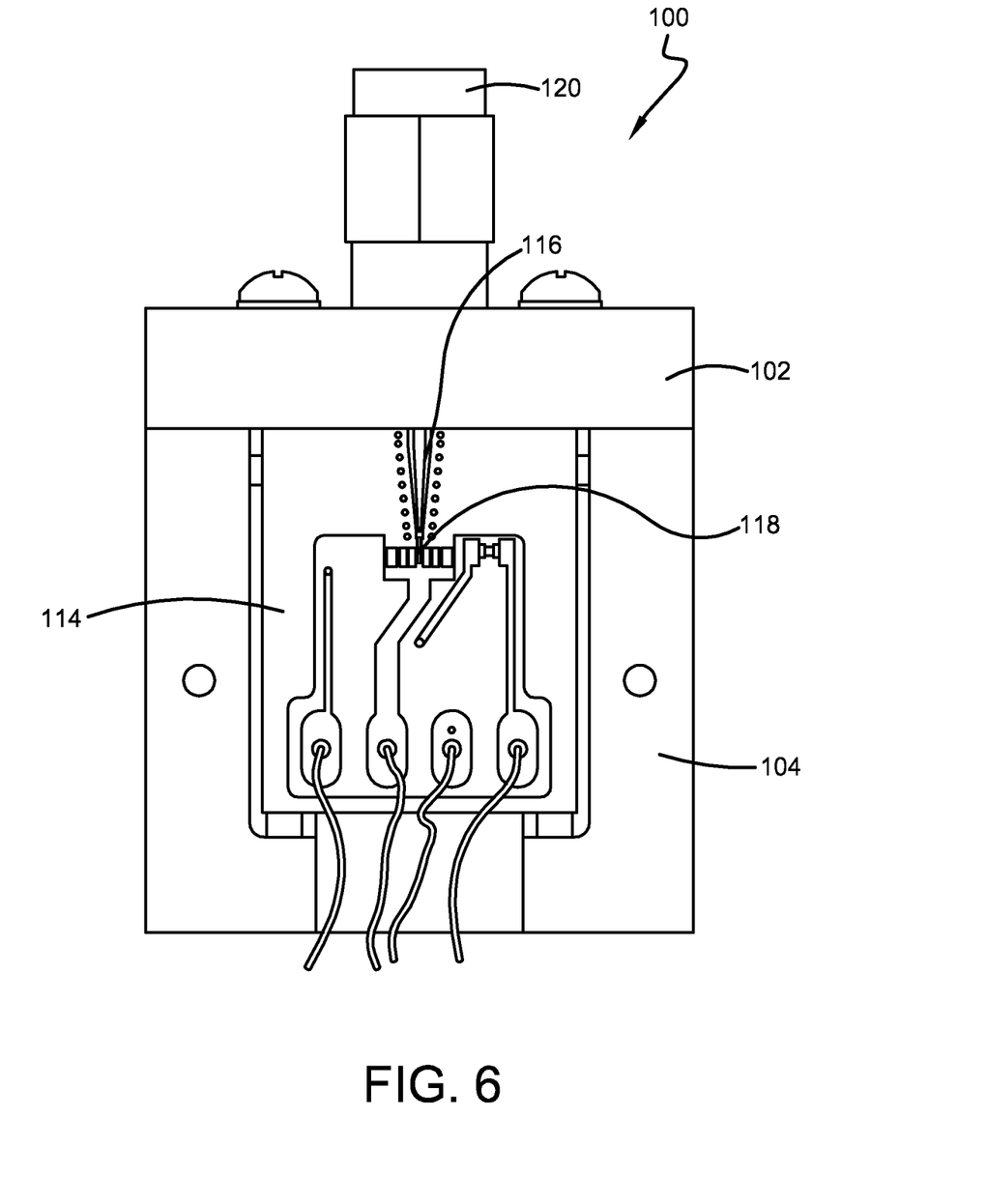
FIG. 6 illustrates a top view of the dual-coplanar sensor assembly in accordance with the disclosed architecture.

FIG. 6 illustrates the dual-coplanar sensor assembly 100 in accordance with the disclosed architecture. The front connector block 102 and bottom housing 104 configuration improves the ability to maintain physical pressure, and therefore electrical contact, on both the center conductor and ground return. Screws provide force against the center conductor, while bellows springs (not shown) provide compliance in ground connection. Substrate 114 rests in the bottom housing 104 and is pressed into a slot in the front connector block 102. The substrate 114 is typically a dielectric substrate and is shown with metal ground planes and coplanar waveguide 116.

The coplanar waveguides 116 are tapered, while maintaining the required impedance to a width such that the center conductor is the same width as a temperature-dependent resistive termination element used to terminate the coplanar waveguide 116. The coplanar waveguides 116 are arranged symmetrically on both sides of the thin dielectric substrate 114. The center conductor of the coaxial airline makes electrical contact with the middle conductor of both the top and bottom coplanar waveguides 116. The characteristic impedance of the top and bottom coplanar waveguides 116 is designed to be approximately twice the characteristic impedance of the coaxial airline, such that the parallel combination of the two coplanar waveguides 116 is the characteristic impedance of the coaxial airline.

Furthermore, the dielectric substrate 114 includes a gap (not shown) in metal between the ground and inside terminal, and a thermistor 118 located in the coplanar waveguide 116. The planar metal conductor of the thermistor 118 is sized to be the same width as the center conductor of the coplanar waveguides 116, to eliminate the reflection due to the sharp discontinuity between the waveguide and fine wire of the thermistor. Further, co-axial connector 120 is where radio frequency (RF) power enters the assembly 100 to travel down the co-axial airline, and be launched into the coplanar waveguides 116, and eventually be dissipated in the thermistor 118.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A thermistor bolometer comprising:
   a front connector block comprising bellows springs utilized for DC and low frequency ground connection;
   a bottom housing; and
   a substrate, wherein the substrate rests in the bottom housing and is pressed into a slot in the front connector block;
   the substrate comprising at least two coplanar waveguides arranged symmetrically on both sides of the substrate, and a center conductor that makes electrical contact with a middle conductor of the at least two coplanar waveguides; and
   wherein a termination resistance of each of the at least two coplanar waveguides is provided by at least two thermistors, with one thermistor per coplanar waveguide; and
   wherein the at least two thermistors are held at a desired resistance by application of DC current from an external source, forming a sensor of a DC substitution bolometer.

2. The bolometer of claim 1, wherein the at least two coplanar waveguides terminate with equal resistances, such that an impedance at a launch matches a co-axial airline impedance.

3. The bolometer of claim 2, wherein the at least two coplanar waveguides are tapered, while maintaining the impedance.

4. The bolometer of claim 3, wherein a circuit path from the at least two thermistors to an outer conductor comprises at least one capacitor, resulting in a DC circuit path through the at least two thermistors that is isolated from the outer conductor.

5. The bolometer of claim 4, wherein the DC circuit path is used to apply DC energy to the thermistors independent of radio frequency (RF) energy supplied through the co-axial airline.

6. The bolometer of claim 5, comprising more than two one thermistors in series, isolated from the outer conductor.

7. The bolometer of claim 6, wherein the at least two thermistors are constructed in a planar form with at least one conductor, such that the at least one conductor has a width and thickness that results in an RF match when placed in series with the center conductor as the termination resistance.

8. The bolometer of claim 7, further comprising at least one bypass capacitor, operating in a current loop, in parallel with at least one higher-value capacitor for bypassing lower-frequency current in a path with higher inductance.

9. The bolometer of claim 8, wherein the substrate is a dielectric substrate.

10. The bolometer of claim 9, wherein the dielectric substrate comprises amorphous Quartz.

11. A method of utilizing a thermistor bolometer, comprising:
    providing a front connector block comprising bellows springs utilized for DC and low frequency ground connection;
    resting a substrate in a bottom housing;
    pressing the substrate into a slot in the front connector block;
    symmetrically arranging at least two coplanar waveguides on both sides of the substrate,
    providing a center conductor that makes electrical contact with a middle conductor of the at least two coplanar waveguides;
    terminating the at least two coplanar waveguides with equal resistances; and
    providing at least two thermistors for the termination resistances of the at least two coplanar waveguides, with one thermistor per coplanar waveguide; and
    holding the at least two thermistors at a desired resistance by application of DC current from an external source, and forming a sensor of a DC substitution bolometer.

12. The method of claim 11, wherein the at least two thermistors are constructed in a planar form with at least one conductor, such that the at least one conductor has a width and thickness that results in an RF match when placed in series with the center conductor as the termination resistance.

13. A structure in which RF energy from a coaxial air-line is launched to a unique dual coplanar waveguide launcher for microwave bolometry, comprising:
    a front connector block;
    a bottom housing; and
    a substrate, wherein the substrate rests in the bottom housing and is pressed into a slot in the front connector block;

the substrate comprising at least two coplanar waveguides arranged symmetrically on both sides of the substrate, a center conductor that makes electrical contact with a middle conductor of the at least two coplanar waveguides, and at least two thermistors that provides termination resistance to the at least two coplanar waveguides, with one thermistor per coplanar waveguide; and wherein the at least two thermistors are held at a desired resistance by application of DC current from an external source, forming a sensor of a DC substitution bolometer.

14. The structure of claim 13, wherein the at least two coplanar waveguides terminate with equal resistances, such that an impedance at a launch matches a co-axial airline impedance.

15. The structure of claim 14, wherein the at least two thermistors are constructed in a planar form with at least one conductor, such that the at least one conductor has a width and thickness that results in an RF match when placed in series with the center conductor as the termination resistance.

16. The structure of claim 15, wherein a circuit path from the at least two thermistors to an outer conductor comprises at least one capacitor, resulting in a DC circuit path through the at least two thermistors that are isolated from the outer conductor.

17. The structure of claim 16, wherein the DC circuit path is used to apply DC energy to the thermistors independent of radio frequency (RF) energy supplied through the co-axial airline.

* * * * *